(12) United States Patent
Malhotra et al.

(10) Patent No.: US 8,560,672 B2
(45) Date of Patent: Oct. 15, 2013

(54) METHODS AND APPARATUS FOR BANDWIDTH EFFICIENT TRANSMISSION OF USAGE INFORMATION FROM A POOL OF TERMINALS IN A DATA NETWORK

(75) Inventors: Vikram Yashpal Malhotra, Carlsbad, CA (US); James D. Coyer, Encinitas, CA (US); An Mei Chen, San Diego, CA (US); Ravinder Chandhok, San Diego, CA (US); Gordon Kent Walker, Poway, CA (US); Ajit L. Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 12/334,291

(22) Filed: Dec. 12, 2008

(65) Prior Publication Data

US 2009/0133025 A1    May 21, 2009

Related U.S. Application Data

(63) Continuation-in-part of application No. 11/491,472, filed on Jul. 21, 2006, now Pat. No. 7,783,748.

(60) Provisional application No. 60/808,615, filed on May 25, 2006.

(51) Int. Cl.
*G06F 15/173* (2006.01)

(52) U.S. Cl.
USPC .......................................... 709/224; 719/318

(58) Field of Classification Search
None
See application file for complete search history.

(56) References Cited

U.S. PATENT DOCUMENTS

| 6,529,515 | B1 | 3/2003 | Raz et al. |
| 7,032,229 | B1 | 4/2006 | Flores et al. |
| 7,089,304 | B2 | 8/2006 | Graham |
| 7,093,250 | B1 | 8/2006 | Rector |

(Continued)

FOREIGN PATENT DOCUMENTS

| EP | 0977389 | 2/2000 |
| JP | 11355229 | 12/1999 |

(Continued)

OTHER PUBLICATIONS

International Search Report—PCT/US2009/067692—International Search Authority—European Patent Office, Apr. 16, 2010.

(Continued)

*Primary Examiner* — Yves Dalencourt
*Assistant Examiner* — Clayton R Williams
(74) *Attorney, Agent, or Firm* — The Marbury Law Group, PLLC

(57) ABSTRACT

Methods and apparatus for bandwidth efficient transmission of usage information from a pool of terminals in a data network. A device includes transceiver logic to receive usage tracking and reporting parameters, wherein the usage tracking parameters identify events to be tracked and the reporting parameters identify reporting criteria for each event, scheduling logic to track the events based on the usage tracking parameters to produce a tracking log, reporting logic to process the tracking log based on the reporting parameters to produce a reporting log, and the transceiver logic to transmit the reporting log. A server includes processing logic to generate usage tracking parameters that identify events to be tracked and reporting parameters that identify reporting criteria for each event and a transceiver to transmit the usage tracking parameters and the reporting parameters to one or more terminals.

71 Claims, 7 Drawing Sheets

(56) References Cited

U.S. PATENT DOCUMENTS

| | | | |
|---|---|---|---|
| 7,215,648 B2* | 5/2007 | Sullivan | 370/278 |
| 7,262,357 B2 | 8/2007 | Plastina et al. | |
| 7,281,045 B2 | 10/2007 | Aggarwal et al. | |
| 7,310,511 B2 | 12/2007 | Barnea et al. | |
| 7,343,390 B2 | 3/2008 | Cohen et al. | |
| 7,376,654 B1 | 5/2008 | Chau et al. | |
| 7,376,722 B1 | 5/2008 | Sim et al. | |
| 7,451,209 B1 | 11/2008 | Schieber et al. | |
| 7,454,503 B2 | 11/2008 | Childress et al. | |
| 7,783,748 B2 | 8/2010 | Chen et al. | |
| 8,239,521 B2* | 8/2012 | Curcio et al. | 709/224 |
| 2003/0079218 A1 | 4/2003 | Goldberg et al. | |
| 2003/0188171 A1* | 10/2003 | DeCenzo et al. | 713/185 |
| 2004/0153767 A1 | 8/2004 | Dolgonos | |
| 2004/0209595 A1 | 10/2004 | Bekanich | |
| 2005/0172786 A1 | 8/2005 | Plastina et al. | |
| 2005/0246439 A1 | 11/2005 | Fong et al. | |
| 2005/0262235 A1 | 11/2005 | Childress et al. | |
| 2005/0262245 A1 | 11/2005 | Menon et al. | |
| 2006/0007901 A1* | 1/2006 | Roskowski et al. | 370/338 |
| 2006/0040642 A1 | 2/2006 | Boris et al. | |
| 2006/0047813 A1 | 3/2006 | Aggarwal et al. | |
| 2006/0074952 A1* | 4/2006 | Rothman et al. | 707/101 |
| 2006/0101224 A1 | 5/2006 | Shah et al. | |
| 2006/0218533 A1 | 9/2006 | Koduru et al. | |
| 2006/0259328 A1 | 11/2006 | Burd et al. | |
| 2007/0081543 A1 | 4/2007 | Brenes et al. | |
| 2007/0261072 A1* | 11/2007 | Boulet et al. | 725/14 |
| 2008/0270598 A1 | 10/2008 | Chen et al. | |

FOREIGN PATENT DOCUMENTS

| | | | |
|---|---|---|---|
| JP | 2008512047 | T | 4/2008 |
| KR | 20070112412 | A | 11/2007 |
| TW | 545019 | | 8/2003 |
| WO | WO0111506 | A1 | 2/2001 |
| WO | 03079588 | | 9/2003 |
| WO | 2006099586 | | 9/2006 |
| WO | WO2006099586 | A1 | 9/2006 |
| WO | 2007140326 | | 12/2007 |
| WO | WO2007140326 | A2 | 12/2007 |

OTHER PUBLICATIONS

International Search Report, PCT/US2009/067692, International Searching Authority, European Patent Office, Apr. 16, 2010.
Written Opinion, PCT/US2009/067692, International Searching Authority, European Patent Office, Apr. 16, 2010.
International Search Report, PCT/US07/069782, International Search Authority, European Patent Office, Nov. 8, 2007.
Written Opinion, PCT/US07/069782, International Search Authority, European Patent Office, Nov. 8, 2007.
International Preliminary Report on Patentability, PCT/US07/069782, International Preliminary Examining Authority, United States, Nov. 28, 2008.
International Search Report—PCT/US2009/036352, International Search Authority—European Patent Office—Sep. 8, 2009.
Written Opinion—PCT/US2009/036352, International Search Authority—European Patent Office—Sep. 8, 2007.
Taiwan Search Report, No. 096118578, TIPO, Jun. 7, 2010.

* cited by examiner

METHODS AND APPARATUS FOR BANDWIDTH EFFICIENT TRANSMISSION OF USAGE INFORMATION FROM A POOL OF TERMINALS IN A DATA NETWORK

CLAIM OF PRIORITY UNDER 35 U.S.C. §120

The present Application for Patent is a Continuation-In-Part (CIP) of patent application No. 11/491,472, now U.S. Pat. No. 7,783,748, entitled "METHODS AND APPARATUS FOR SAMPLING USAGE INFORMATION FROM A POOL OF TERMINALS IN A DATA NETWORK" filed Jul. 21, 2006, and assigned to the assignee hereof, which claim priority to U.S. Provisional Application 60/808,615, filed May. 25, 2006 and hereby expressly incorporated by reference herein.

BACKGROUND

Data networks, such as wireless communication networks, have to trade off between services customized for a single terminal and services provided to a large number of terminals. The distribution of content (data) to a large number of terminals (subscribers) is a complicated problem. Therefore, it is very important for network administrators and content providers to understand how well services are being provided over the network and how terminal users are utilizing the provided services.

Typically, network tracking systems monitor terminal interaction with a network server. For example, terminal users may contact the server to download applications, make content selections, answer survey questions, or to request any other type of service. The server may then track these requests to monitor what services are being delivered to users and to get some idea of user satisfaction from survey results.

Unfortunately, monitoring terminal usage at the server from terminal requests may not be very accurate and does not provide all the information that network administrators and content providers would like to have. For example, the server is limited to obtaining information from only those terminals that contact the server, and so information about non-requesting terminals may not be obtained. Additionally, the types of information that can be obtained may be limited. For example, the server may be able to determine what content is being delivered, but may not be able to determine how efficiently the content was delivered or how the content is being used at the terminal. Furthermore, current systems may not be able to gather information from the same terminals over a selected time period so that historical data can be assembled. Finally, a conventional system may not protect the identity of the terminals it monitors so that the privacy of the terminal users may be at risk.

Therefore, what is needed is a usage tracking system for use in network environments that operates to track terminal usage and provides for bandwidth efficient transmission of tracking data to a network server.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a usage tracking system that operates to track usage information pertaining to one or more terminals in a data network and provides bandwidth efficient transmission of usage tracking data. The system is especially well suited for use in wireless networks environments, and may be used in any type of network environment, including but not limited to, communication networks, public networks, such as the Internet, private networks, such as virtual private networks (VPN), local area networks, wide area networks, long haul network, or any other type of data network.

In one or more aspects, the usage tracking system operates to collect usage statistics from one or more terminals in a data network. A usage tracking server is provided that operates to collect the usage statistics and store these statistics into a usage tracking database. Once collected, the usage statistics can be used to produce reports, historical data, or other summary information that may be used by information servers, advertisers, network administrators, content providers, or any other entity that may require usage information in the data network. In an aspect, the system operates to provide bandwidth efficient transmission of usage tracking data from the terminals to the usage tracking server. For example, each terminal uses selected reporting criteria to determine information from tracking logs that will be transmitted back to the usage tracking server. Thus, use of the reporting criteria reduces the size and frequency of tracking data that needs to be transmitted thereby saving transmission bandwidth and avoiding log jams.

Figure 1:
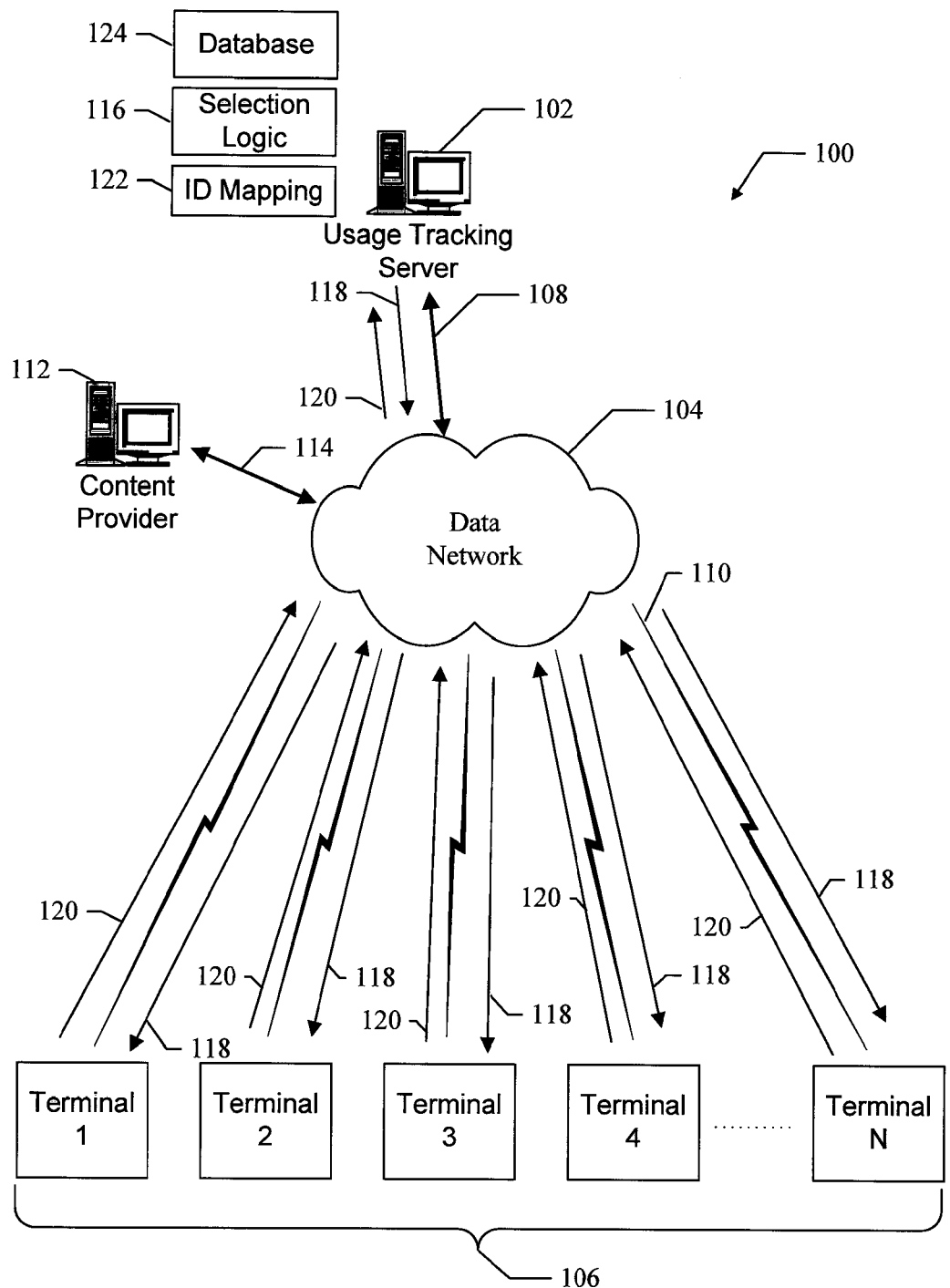
FIG. 1 shows a data network that illustrates aspects of a usage tracking system.

FIG. 1 shows a data network 100 that comprises aspects of a usage tracking system. The network 100 comprises a usage tracking server 102, a data network 104, and a pool of terminals (1 thru N), as shown at 106. The data network 104 may be any type and/or combination of wired and/or wireless networks that allow data to be transmitted between the server 102 and the terminals 106. The server 102 communicates with the network 104 via the communication channel 108. The communication channel 108 may be any type of wired or wireless communication channel that allows the server 102 to communicate with the data network 104 and ultimately with the terminals 106. The data network 104 provides communication with the terminals 106 via wireless communication links 110 that allow data to be wirelessly transmitted between the network 102 and the terminals 106. In an aspect, the wireless communication links 110 comprise forward communication channels, reverse communication channels, control channels, and/or any other type of communication channel that may be used to communicate information between the network 104 and the terminals 106.

The network 100 also includes a content provider 112 that operates to provide content to entities in communication with the network 104, such as the terminals 106. For example, the content provider 112 communicates with the network 104 via the link 114 to provide applications, programs, multimedia content, advertising and/or any other type of content and/or data for use by the terminals 106

The usage tracking server 102 comprises selection logic 116 that operates to select one or more of the terminals 106 for usage tracking. For example, the selection logic 116 selects a targeted set of terminals from the pool of terminals 106 and those targeted terminals will perform usage tracking based on parameters provided by the usage tracking server 102. For example, the server 102 transmits usage tracking and reporting parameters to all terminals of the pool of terminals 106, as shown at 118. For example, the server 102 transmits the usage tracking and reporting parameters using at least one of a broadcast, a multicast, a unicast, or control channel transmission. Each of the terminals 106 processes the tracking parameters to determine if it is a targeted terminal and required to perform usage tracking. For example, in an aspect, the tracking parameters include a sampling percentage or fraction indicator that specifies a response range. If a random number generated at each terminal is within the response range, then that terminal is a targeted terminal and performs usage tracking according to the tracking parameters. It is also possible that all terminals are selected for usage tracking. By selecting all terminals, it may be possible to get more accurate tracking.

The terminals selected for usage tracking the process the reporting parameters to determine when to report information from their tracking logs. For example, the reporting parameters operate to allow a terminal to determine when to report a particular piece of tracking information. For example, the reporting parameters may specify that the fifth occurrence of a particular event be reported. Once the terminal determines information to be reported based on the reporting parameters, the information is transmitted to the server 102, as shown at 120.

The server 102 also comprises identity (ID) mapping logic 122 that operates to map the identity of responding terminals so that the privacy of the usage tracking data they provide will be protected. For example, the mapping logic 122 associates the usage tracking data with device log identifiers that do not directly identify the source of the usage tracking data. The usage tracking data and device log identifiers are then stored in a usage tracking database 124. By storing the usage tracking data in the database 124, it is possible for the server 102 to construct a usage tracking history for any of the terminals 106.

In various aspects, the terminals 106 report usage tracking information so as to efficiently utilize reverse link bandwidth. For example, all of the terminals 106 may be instructed to perform usage tracking. If all the terminals 106 attempt to transmit their tracking logs at the same time, it is possible that a log jam will occur on the reverse link thereby preventing data from reaching the server 102. In an aspect, the use of reporting criteria prevents log jams and efficiently utilizes reverse link bandwidth.

In an aspect, a terminal utilizes received reporting parameters to determine when (or under what conditions) a tracked event is to be reported. For example, the number of times an advertisement is shown to a terminal user may not be reported until a selected threshold is reached. Conversely, if the advertisement is shown more than a selected number of times within a predetermined time interval, then it is not necessary for the terminal to report this activity. Thus, various conditions, requirements, limits, or other criteria may be identified by the tracking parameters that can be used to determine when tracked events are reported. This results in fewer and/or less frequent reports being transmitted, which saves bandwidth and reduces the possibility of log jams on the reverse link.

Thus, in various aspects, the usage tracking system operates to track the usage of one or more terminals in a data network. The resulting usage database may be used to generate reports for a variety of network entities, such as the content provider 112 and/or network administrators, advertisers, and any other entity interested in the operation of the network and/or the terminals 106. In an aspect, the tracking data is further processed using reporting criteria so as to reduce the amount of information to be reported and/or reduce the reporting frequency, thereby improving bandwidth efficiency.

Tracking Overview

An overview of the types of functions and information that may be collected during operation of the usage tracking system is provided in the following sections. However, it should be noted that the described information is intended to be illustrative and not limiting of the types of information that may be tracked and collected by the system. Thus, the system may operate to collect virtually any type of information available at a terminal device.

Usage Statistics The usage tracking system can be used to collect various usage statistics. In various aspects, the following usages statistics are collected. It should be noted that the below list is illustrative and not exhaustive and that aspects of the system are operable to collect any other type of usage statistic.

a. Types of presentations viewed
b. Time spent viewing presentations
c. Frequency and/or number of presentations viewed
d. Links selected during a presentation
e. Key hits during a presentation
f. Calls for action in response to a presentation Statistical Sampling The usage tracking system can operate using statistical sampling. For example, any percentage of the terminal population (targeted terminals) may be selected to log and return usage tracking data. Terminals may be selected randomly or by the use of any type of selection algorithm so that any type of probability sampling method may be implemented to select terminals to log usage data.

User Anonymity The usage tracking system operates to ensure the privacy of the usage tracking data that is collected. For example, usage tracking data may be stored in an anonymous manner to protect the identity of the logging device and its user. In an aspect, a terminal sends the logged usage data to a usage server in an identifiable manner. However, the usage server operates to generate a unique device log identifier from the terminal identifier to protect the identity of the terminal. For example, in an aspect, a hashing algorithm is used to generate the unique device log identifier from the actual terminal identifier. Thus, it is computationally infeasible to determine the terminal identification from the unique device log identifier. The received tracking data is then stored along with the unique device log identifier in a database, and as a result, the data is not traceable to any particular terminal or user.

Enable/Disable The usage tracking system operates so that terminals log usage data within selected logging windows. In an aspect, the usage tracking system provides usage tracking parameters to the terminals to indicate when a terminal should initiate logging of usage data, the duration of the logging, etc. Once the logging window expires the terminal discontinues logging usage data. The terminal may also be instructed to discontinue logging before the logging window expires.

Usage Tracking Parameters

The usage tracking server conveys the usage tracking parameters to the terminals through an overhead notification mechanism. For example, the overhead notification mechanism may comprise a control channel that allows the usage server to communicate control information to the terminals. However, in various aspects, the overhead notification mechanism may be any type of in-band or out-of-band communication channel between the usage tracking server and the terminals. For example, the usage tracking parameters may be transmitted to terminals in a broadcast, unicast, or other type of transmission.

The usage tracking parameters are sent using the overhead notification mechanism and indicate to the terminal when it should initiate logging, duration of the logging, events, states to be logged, etc. The logging events or logging states determine what kind of usage data is to be logged. For example, logging events like a presentation viewing event indicate that data should be capture that describes how many times the user views a presentation, when the user views the presentations and so on. The logging event/state can be independently enabled or disabled through a logging mask.

The following is an illustrative list of usage tracking parameters that may be sent to each terminal to control how usage tracking is performed. It should be noted that the following list is not exhaustive and that it is possible to send virtually any type of parameter to the terminals to control the usage tracking operation.

1. Logging Start time—Indicates when a terminal should commence the logging function.
2. Logging Window—Indicates the duration of the logging function.
3. Logging Mask—Indicates the Logging Events and States to be logged. Each Logging Event and State can be independently enabled or disabled through the logging mask.
4. Sampling Percentage—Indicates the percentage of the terminals that are required to log data. Sampling Percentage is used as a reference by the terminal to determine whether it should initiate logging or not. For example, if the sampling percentage or fraction is set to ten, approximately 10% of the terminals will log usage data. For example, in an aspect, the terminals generate a random number uniformly distributed between 1 and 100. A terminal will only initiate the logging function if the random number generated is less than or equal to the sampling percentage (i.e., 10).
5. Seed—A Seed can be used to target the same as well as a different set of terminals to log usage information. In an aspect, each terminal uses an exclusive-OR (EXOR) function to combine the Seed with the electronic serial number (ESN) of that terminal to generate the random number. The random number is then compared with the sampling percentage to decide whether the terminal needs to perform the logging function.
6. Log Size—This is the maximum amount of memory that the terminal reserves for storing the logged usage tracking data.
7. Logging Status—This parameter can take one of the three values as described below.
   a. Logging On—This value indicates to the terminal that the current usage tracking request is valid and that the terminal should continue logging.
   b. Stop logging and Send Log—This value indicates that the terminal should discontinue logging for the remaining period of the usage tracking notification. The terminal then uploads the logged data at the next packet data session.
   c. Stop logging and Discard Log—This value indicates that the terminal should stop logging for the remaining period of the usage tracking notification and delete the logged data.

In various aspects, the tracking parameters may be in any suitable format and/or data type. For example, each tracking parameter may comprise a parameter identifier and a parameter value. The tracking parameters may be transmitted to the terminals in a single transmission or in multiple transmissions. Furthermore, any number of tracking parameters may be transmitted to the terminals and the tracking parameters may be updated at any time. For example, a set of tracking parameters may be transmitted to the terminals using the overhead notification mechanism, and thereafter, another set of tracking parameters may be transmitted, which operate to change, modify, add to, or delete from the previously transmitted set. Thus, the usage server operates to determine what tracking parameters to send to the terminals to perform the desired usage tracking operation.

A logging window defines a logging session that indicates the amount of time a terminal performs the logging function. In an aspect, the system provides multiple logging sessions, however, it is preferable to have non-overlapping logging sessions, which means that there will be only one outstanding logging window active at each device at any instant of time. This avoids duplication of logged data in multiple logging windows. After the expiration of the logging window, whenever the terminal contacts the usage tracking server to request any updates, the terminal uses this same session to send the logged usage tracking data to the server. In an aspect, the terminal piggybacks the logged data at the next packet data session with the server if the memory required to store the logged usage tracking data crosses a certain threshold percentage of the reserved memory. For example, after the terminal has stored enough data to fill eighty percent of the reserved memory (based on the log size), the terminal piggybacks the logged data at the next packet data session with the server.

Anonymous Logging

In various aspects, the usage tracking system operates to protect the privacy rights of the terminal users. For example, in an aspect, each terminal sends the logged usage data to the usage tracking server in an identifiable manner. On receiving the logged data, the usage tracking server generates a device log identifier using a hashing algorithm. The hashing algorithm is such that it is computationally infeasible to determine the terminal identity from the device log identifier. The inputs to the hashing algorithm are the actual terminal identifier and a subscriber identifier, since a combination of these identifiers uniquely identifies a terminal. The hashing algorithm ensures that the generated device log identifier is unique. The device log identifier can also be used to access and/or correlate tracking data received from a device as the result of a prior logging session.

In various aspects, a variety of hashing algorithms may be used to generate the device log identifier, such as Rotating, One-Time-Hash, CRC-32, MD5, and SHA-1. However, taking into account the collision probability and the complexity of the hashing scheme, the hashing algorithm preferred for generation of the device log identifier is MD5 because the probability of collision for MD5 is very low.

Reporting Parameters

In various aspects, the usage tracking parameters comprise reporting parameters that are associated with the events being tracked. The reporting parameters provide a way to notify the terminals regarding criteria to be used to determine when a tracked event is required to be reported. For example, the reporting parameters may indicate to a terminal that it is not necessary to report less than ten viewings of a selected presentation. Alternatively, the reporting parameters may indicate to a terminal that is it necessary to report up to the first five link selections associated with a presentation. A more detailed description of the reporting parameters is provided in another section of this document.

Figure 2:
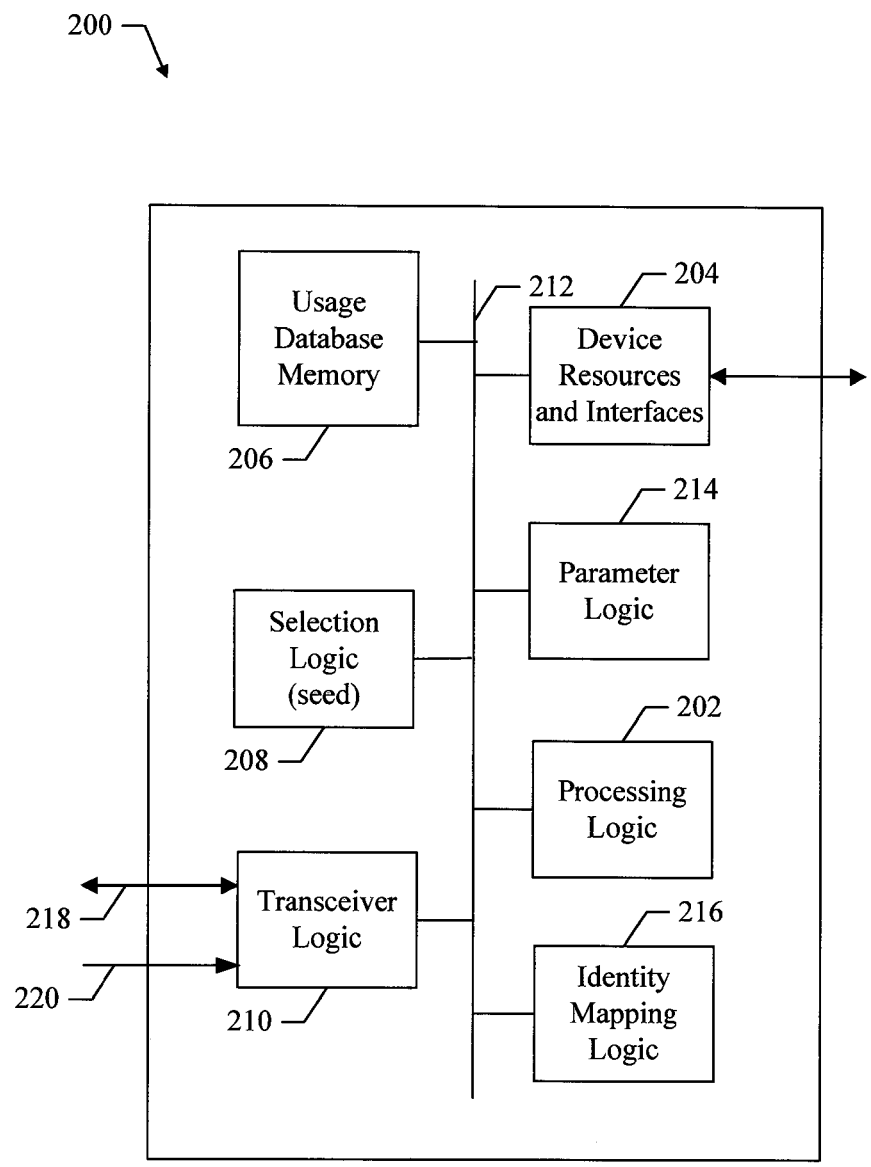
FIG. 2 shows an exemplary usage tracking server suitable for use in aspects of a usage tracking system.

FIG. 2 shows an exemplary usage tracking server 200 suitable for use in aspects of a usage tracking system. For example, the server 200 may be used as the server 102 in FIG. 1. The server 200 comprises processing logic 202, device resources 204, usage database 206, selection logic 208, and transceiver logic 210, all coupled to a data bus 212. The server 200 also comprises parameter logic 214 and identity mapping logic 216, which are also coupled to the data bus 212.

In various aspects, the processing logic 202 comprises at least one of a CPU, processor, gate array, hardware logic, memory elements, virtual machine, and/or hardware executing software. Thus, the processing logic 202 generally comprises logic to execute machine-readable instructions to control one or more functional elements of the server 200 via the data bus 212.

The device resources and interfaces 204 comprise hardware and/or hardware executing software that allow the server 200 to communicate with internal and external systems. For example, internal systems may include mass storage systems, memory, display driver, modem, or other internal device resources. The external systems may include user interface devices, printers, disk drives, or other local devices or systems.

The usage database 206 comprises any type of memory operable to store usage data received from one or more terminals in a data network. For example, the usage data may comprise usage statistics, device parameters, network parameters, or any other type of usage tracking data.

The parameter logic 214 comprises at least one of a CPU, processor, gate array, hardware logic, memory elements, virtual machine, and/or hardware executing software. The parameter logic 214 operates to generate usage tracking and reporting parameters. The usage tracking parameters represent information that describes how terminals in a data network should operate to log usage tracking data. For example, in an aspect, the usage tracking parameters may indicate how a terminal is to track and log the operation of an application program, or track and log the viewing of a presentation by a device user. In an aspect, the reporting parameters provide criteria to determine when a tracked event is to be reported. A more detailed description of the usage tracking and reporting parameters is provided in another section of this document. The usage tracking and reporting parameters may be formatted in any suitable format or be of any suitable data type, and any number of parameters may be transmitted by the server to the terminals in one or multiple transmissions.

The transceiver logic 210 comprises hardware and/or hardware executing software that operate to allow the server 200 to transmit and receive data and/or other information with remote devices or systems. In an aspect, the transceiver logic 210 provides a communication channel 218 that comprises one or more of a broadcast, multicast, or unicast transmission channels. In another aspect, the communication channel 218 comprises a control channel that is operable to transmit control information to remote devices. Thus, the communication channel 218 is operable to transmit the usage tracking and reporting parameters to one or more terminals on a data network using at least one of broadcast, multicast, unicast, or control channel transmissions. The transceiver logic 210 also provides a reverse link 220 that is operable to receive tracking information from one or more terminals on a data network.

The selection logic 208 comprises hardware and/or hardware executing software that operate to allow the server 200 to select one or more terminals in a data network for usage tracking. For example, in an aspect, the selection logic 210 uses a percentage indicator to indicate what percent of the existing pool of terminals should perform usage tracking. For example, the percentage indicator is transmitted to the terminals as part of the tracking parameters. The terminals generate a random number that is compared to the percentage indicator. If the random number is within the range of the percentage indicator, then the terminal will perform usage tracking. In another aspect, the selection logic 210 utilizes a "seed" value that targets one or more terminals. For example, in an aspect, the seed value is transmitted as part of the tracking parameters and each terminal uses an exclusive-OR (EXOR) function to combine the seed value with the electronic serial number (ESN) of that terminal to generate the random number. The random number is then compared with the sampling percentage to decide whether the terminal needs to perform the logging function. Such a technique is a repeatable or "deterministic" function because it allows the selection logic 210 to select the same set of target terminals for multiple tracking sessions. This allows historical tracking data for any terminal to be collected. However, the selection logic 210 is not limited to using any particular selection scheme so that any suitable type of selection technique may be used by the selection logic 210 to select the targeted set of terminals.

The identity mapping logic 216 comprises a CPU, processor, gate array, hardware logic, memory elements, virtual machine, and/or hardware executing software. The identity mapping logic 216 operates to map the identity of terminals that transmit usage data to the server. For example, in an aspect, the identity mapping logic 216 uses a hashing function to process the original identity of a terminal to produce a device log identity that is associated with the usage tracking data provided by that terminal. The tracking data and device log identity are then stored in the usage database 206 for later processing.

During operation of the server 200, the selection logic 208 determines a targeted set of terminals to perform usage tracking. The targeted set of terminals may comprise one or more terminals from an available pool of terminals. For example, a selection percentage indicator is included in the tracking parameters to activate the targeted set of terminals. Usage tracking parameters are assembled by the parameter logic 214 so that the targeted set of terminals will be activated to perform usage tracking. For example, the usage tracking parameters may indicate the terminals are to track a particular application or presentation at a device.

In addition, reporting parameters are generated by the parameter logic 214 and associated with the tracking parameters. The reporting parameters provide information as to when a tracked event is to be reported back to the server. For example, to save reverse link bandwidth, the reporting parameters may indicate that a terminal does not transmit usage tracking information associated with a particular presentation until a particular criteria is met. For example, the reporting parameters may be generated to instruct the terminal not to report usage information until the presentation is viewed on the device a selected number of times. The tracking and reporting parameters are transmitted to all terminals in the pool of terminals via the overhead notification mechanism 218.

Each receiving terminal processes the tracking parameters to determine if it is a targeted terminal. For example, in an aspect, each terminal processes the selection percentage indicator to determine if it is a targeted terminal. If a terminal determines that it is a targeted terminal, it performs usage tracking according to the tracking parameters. As the targeted terminals are performing the requested usage tracking, they process the reporting parameters to determine when tracked events are to be transmitted to the server. Thus, transmission of usage tracking data is based on criteria provided by the reporting parameters so that the reverse link bandwidth can be used efficiently.

In an aspect, the usage tracking system comprises a computer program product having one or more program instructions ("instructions") or sets of "codes" stored or embodied on a machine-readable medium. When the codes are executed by at least one processor, for instance, a processor at the processing logic 202, their execution causes the processor to provide the functions of the usage tracking system described herein. For example, the machine-readable medium comprises a floppy disk, CDROM, memory card, FLASH memory device, RAM, ROM, or any other type of memory device or machine-readable medium that interfaces to server 200. In another aspect, the sets of codes may be downloaded into the server 200 from an external device or communication network resource. The sets of codes, when executed, cause the server 200 to provide aspects of a usage tracking system as described herein.

Figure 3:
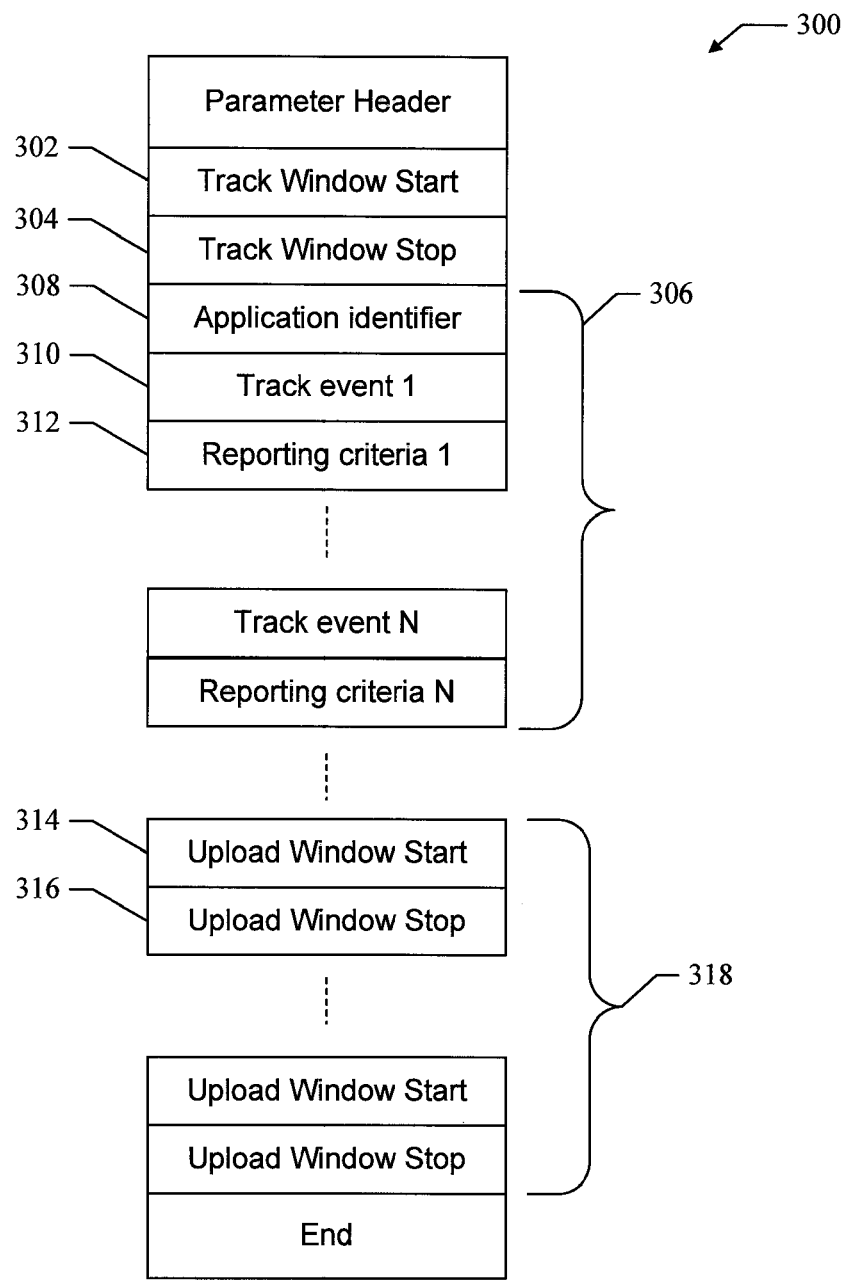
FIG. 3 shows exemplary tracking and reporting parameters for use in aspects of a usage tracking system.

FIG. 3 shows exemplary tracking and reporting parameters 300 for use in aspects of a usage tracking system. For example, in an aspect, the tracking and reporting parameters 300 are generated by the parameter logic 214. The tracking parameters 300 comprise a tracking window start indicator 302 and a tracking window stop indicator 304 that identify when usage tracking at targeted terminals is to begin and end.

The tracking parameters 300 also comprise one or more instances 306 comprising an application identifier 304, one or more tracking parameters 310, and one or more reporting parameters 312. For example, the application identifier 304 identifies a particular application and the one or more tracking parameters 310 identify events that are to be tracked. The one or more reporting parameters 312 identify criteria that are used to determine when to report the tracked data. In an aspect, the following events can be tracking during operation of the usage tracking system. It should be noted that the below list is not exhaustive and that the system is operable to track other types of events.
1. User Behavior Events, such as a user interface launch event, subscription event, URL activity event, or purchase event.
2. Delivery Events, such as a license delivery event or presentation delivery event.
3. Failure Events, such as real-time service play event, subscription failure event, or presentation delivery failure event.
4. Mobility Events, such as time zone change, or other mobility events.
5. System Events, such as usage tracking session abort event.
6. Cellular Service Event, such as SMS send/receive event, voice call event, or packet data event.
7. Other Events.

In an aspect, the reporting parameters indicate a threshold that is used to determine when to report a tracked event. For example, a reporting parameter of "+5" indicates that the associated event should not be reported until after the fifth occurrence. Likewise, a reporting parameter of "−4" indicates that only the first three occurrences of an associated event should be reported. A range of occurrences may also be specified. Thus, the reporting parameters can be defined to indicate any number of occurrences of an event and how each event should be reported based on those occurrences.

The tracking parameters 300 also comprise an upload window start time 314 and an upload window stop time 316. The upload start 314 and stop 316 times define an upload window during which a designated terminal is to upload its tracking data. In an aspect, multiple upload window start and stop times defining multiple upload windows are provided as illustrated at 318.

Figure 4:
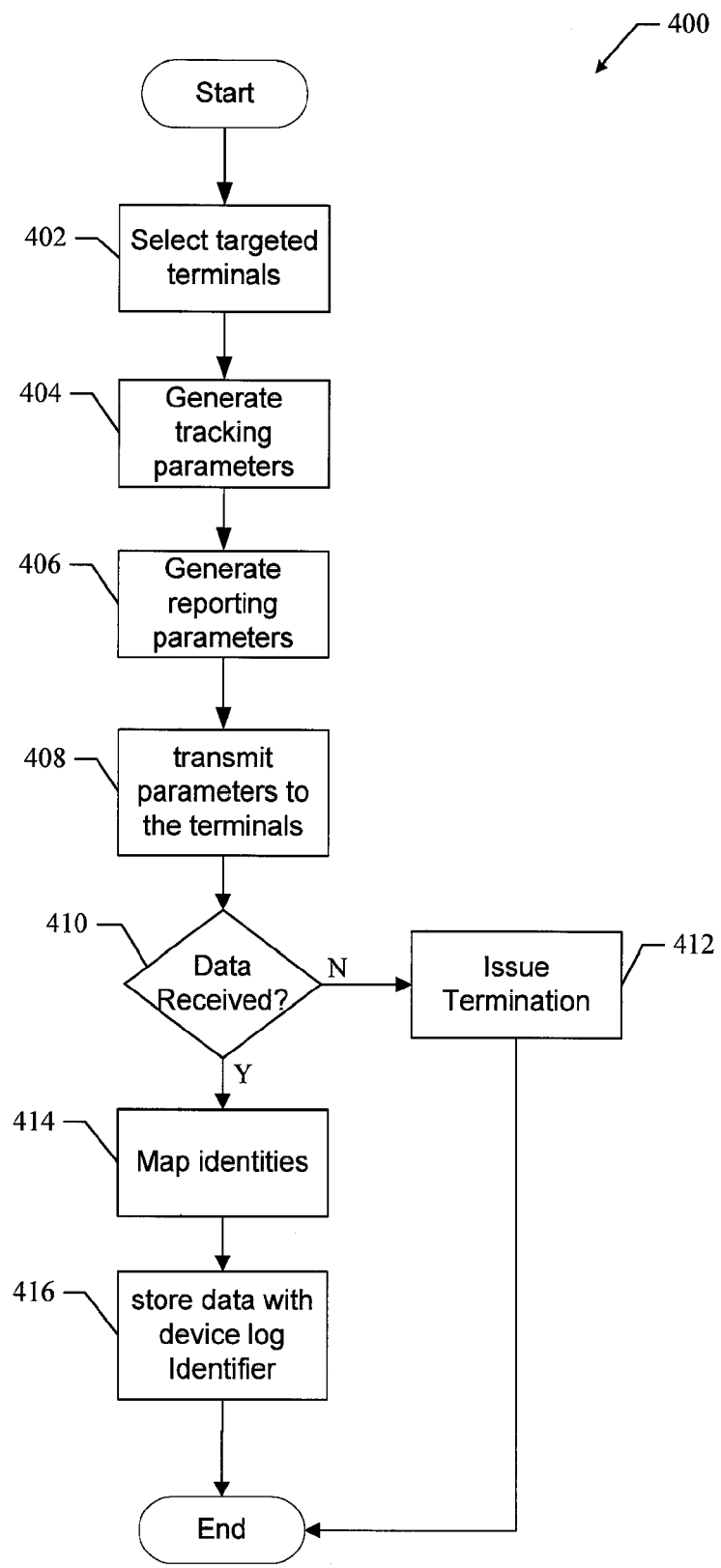
FIG. 4 shows an exemplary method for operating a server for use in aspects of a usage tracking system.

FIG. 4 shows an exemplary method 400 for operating a server for use in aspects of a usage tracking system. For clarity, the method 400 will be described with reference to the server 200 shown in FIG. 2. In one or more aspects, the processing logic 202 executes program instructions to perform the functions described below.

At block 402, a set of terminals is targeted for usage tracking. For example, in an aspect, the processing logic 202 controls the selection logic 208 to select a targeted set of terminals. The selection logic 208 may use a percentage indicator or a seed value to determine a set of terminals that will be requested to perform usage tracking. Virtually any technique may be used to select the targeted set of terminals, including repeatable or deterministic functions that allow the same terminals to be repeatedly selected.

At block 404, usage tracking parameters are generated that are to be transmitted to the terminals. For example, usage tracking parameters indicate which terminals are to perform usage tracking, and which events are to be tracked by those terminals. In an aspect, the parameter logic 214 operates to generate the usage tracking parameters.

At block 406, reporting parameters are generated that are to be transmitted to the terminals. For example, reporting parameters indicate various thresholds that can be used to determine when (or under what conditions) tracked events are to be reported by the terminals. In an aspect, the parameter logic 214 operates to generate the reporting parameters.

At block 408, the generated usage tracking and reporting parameters are transmitted to the terminals. In an aspect, the parameters are transmitted only to the targeted terminals. In another aspect, the parameters are transmitted to all terminals in a pool of terminals. For example, the processing logic 202 controls the transceiver 210 to transmit the parameters via a broadcast, multicast, unicast, and/or a control channel transmission using the control channel 218. In an aspect, the parameters are transmitted using any type of overhead notification mechanism. Furthermore, the parameters may be transmitted in one or more transmissions and updated as necessary.

At block 410, a determination is made as to whether usage tracking data has been received at the server. For example, each of the targeted terminals performs usage tracking to obtain tracking data according to the usage tracking parameters. The terminals process the reporting parameters to determine when a tracked event is to be transmitted in a tracking report. Once the tracking report is determined, the terminals transmit the tracking report to the server using the reverse link. If tracking data is received at the server, the method proceeds to block 414. If tracking data is not received, the method proceeds to block 412.

At block 412, it is possible for the usage server to terminate any pending tracking operation. In an aspect, the server disables terminal logging by causing an early expiration of the logging window before its scheduled expiration time. For example, the usage tracking server sets the logging window parameter to zero and transmits this parameter to the terminal, which causes the terminal to terminate any pending usage tracking. However, this termination technique does not provide any information to the terminal about what needs to be done with any data that has already been logged. Thus, the logged data could either be discarded or be uploaded to the usage tracking server in another communication session with the server.

In another aspect, an additional usage tracking parameter referred to as Logging Status is transmitted to the terminal. The Logging Status field indicates to the terminal whether the terminal should discontinue logging and provides information on whether the logged data should be discarded. For example, if it is required that the terminal discard the logged data, the Logging Status field can be set to "Stop Logging and Discard Log." When the terminal receives the updated parameters, depending upon the "Logging Status" value it either piggybacks the logged data in a transmission to the server or discards it. The method then ends.

At block 414, assuming tracking reports have been received; the identities of the responded terminals are mapped to device log identifiers. For example, in an aspect, the identity mapping logic 216 uses a hash function to map the identity of a terminal to a device log identity. The hash function takes the true identity of the terminal as input, and generates the device log identity. The device log identity cannot be reversed to discover the true identity of the terminal. Although a hash function has been described, it is possible to use any suitable identity mapping technique to protect the identity of the responding terminals.

At block 416, the usage tracking data from responding terminals is associated with the appropriate device log identifiers. The data and the device log identifiers are then stored in the usage database 206. The server 200 may now create usage reports from the received usage tracking data. The usage reports will reference the device log identifiers so that the privacy of the actual terminals is protected from disclosure.

It should be noted that the method 400 illustrates just an aspect and that changes, additions, or rearrangements of the flow elements may be made without deviating from the scope of the described embodiments.

Figure 5:
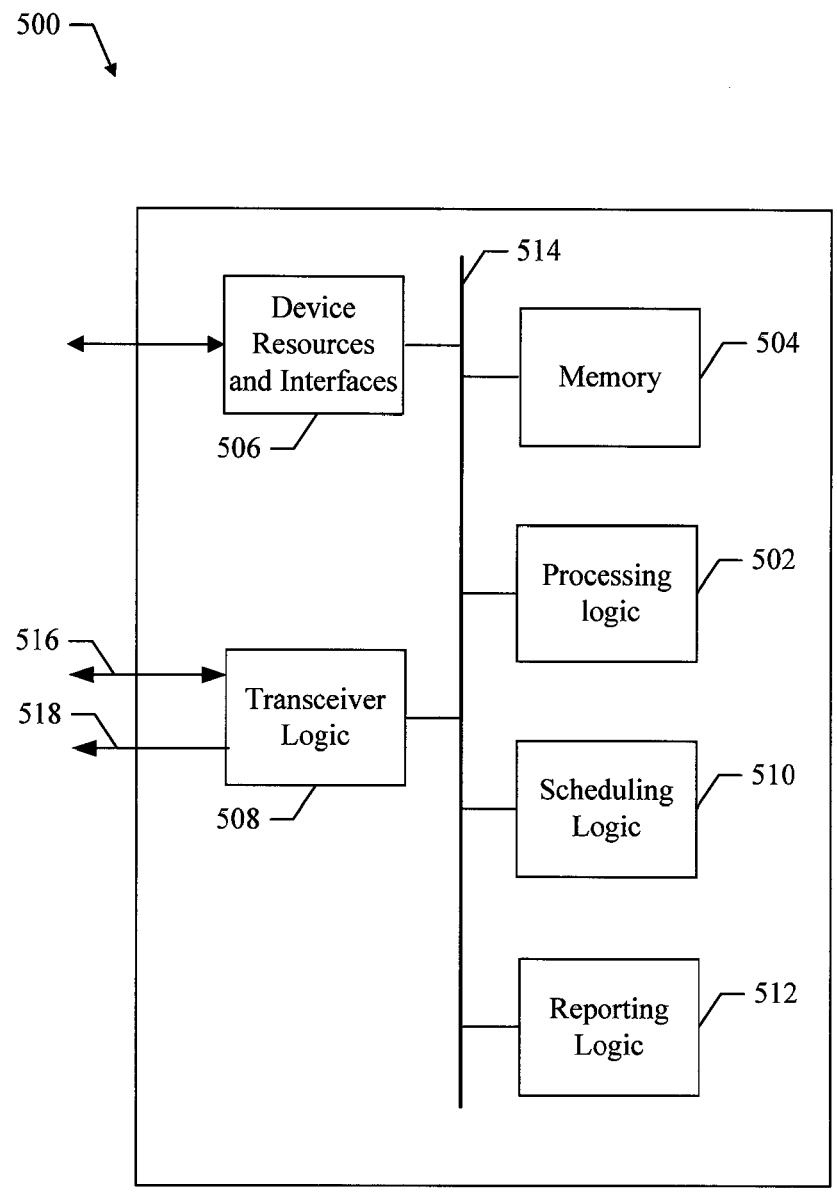
FIG. 5 shows an exemplary terminal suitable for use in an aspects of a usage tracking system.

FIG. 5 shows an exemplary terminal 500 suitable for use in aspects of a usage tracking system. The terminal 500 comprises processing logic 502, memory 504, device resources and interfaces 506, transceiver logic 508, all coupled to a data bus 514. The terminal 500 also comprises scheduling logic 510 and reporting logic 512, which are also coupled to the data bus 514.

In various aspects, the processing logic 502 comprises at least one of a CPU, processor, gate array, hardware logic, memory elements, virtual machine, and/or hardware executing software. Thus, the processing logic 502 generally comprises logic to execute machine-readable instructions to control one or more other functional elements of the terminal 500 via the data bus 514.

The device resources and interfaces 506 comprise hardware and/or hardware executing software that allow the terminal 500 to communicate with internal and external systems. For example, internal systems may include mass storage systems, memory, display driver, modem, or other internal device resources. The external systems may include user interface devices, printers, disk drives, or other local devices or systems.

The transceiver logic 508 comprises hardware and/or hardware executing software that operate to allow the terminal 500 to transmit and receive data and/or other information with external devices or systems. For example, the transceiver logic 508 is configured to communicate over a control channel 516 to receive control information, such as usage tracking and reporting parameters from a remote server. In another aspect, the transceiver logic 508 is configured to receive usage tracking and reporting parameters over at least one of broadcast, multicast, unicast, or control channel transmission.

In an aspect, the transceiver logic 508 is configured to transmit tracking information to a usage server over a reverse link 518. For example, reporting logs generated at the terminal 500 are transmitted by the transceiver logic 508 over the reverse link 518.

The memory 504 comprises any type of memory suitable for storing information at the terminal 500. For example, the terminal 500 may operate to log usage data according to usage tracking parameters and store the usage data in the memory 504 for further processing.

The scheduling logic 510 operates to schedule logging of usage data according to usage tracking parameters. For example, the scheduling logic 510 may receive the usage tracking parameters via a transmission from a usage server. The usage parameters describe how, what, and when the terminal 500 will log usage data. If the usage parameters identify a time window within which the data should be logged, the scheduling logic 510 alerts the processing logic 502 to log the data within the defined time window.

During operation, the terminal 500 operates according to various aspects of a usage tracking system to log usage data. In an aspect, the terminal performs one or more of the following functions to log the usage data. It should be noted that the following functions may be changed, rearranged, modified, add to, or otherwise adjusted within the scope of the embodiments.

1. The terminal receives tracking parameters via an overhead notification mechanism, such as control channel 516.
2. The terminal determines from the tracking parameters whether it is a targeted terminal.
3. If the terminal is a targeted terminal, it determines from the tracking parameters what events are to be tracked and when the tracking should occur. The terminal may also obtain other information or instructions from the tracking parameters.
5. The terminal then performs usage tracking according to the tracking parameters and stores the logged tracking data into its local memory.

The reporting logic 512 operates to process received reporting parameters to determine when (or under what conditions) a tracked event is to be reported to a usage tracking server. For example, the reporting logic 512 may receive the reporting parameters via a transmission from a usage server. The reporting parameters describe criteria that are used to determine tracking information that is placed into a reporting log. For example, the reporting parameters associated with a presentation may indicate that the presentation should be viewed ten times before reporting this event to the usage tracking server. Thus, the reporting parameters may specify any criteria to control when event tracking information is reported so as to control and efficiently utilize network bandwidth.

The reporting logic 512 processing the tracking information based on the reporting parameters to generate a reporting log. The reporting log is transmitted to a usage tracking server at the appropriate time. For example, the reporting log may be transmitted over the reverse link 518 to the usage tracking server during a pre-defined transmission window.

In an aspect, the usage tracking system comprises a computer program product having one or more program instructions ("instructions") or sets of "codes" stored or embodied on a machine-readable medium. When the codes are executed by at least one processor, for instance, a processor at the processing logic 502, their execution causes the processor to provide the functions of the usage tracking system described herein. For example, the machine-readable medium comprises a floppy disk, CDROM, memory card, FLASH memory device, RAM, ROM, or any other type of memory device or machine-readable medium that interfaces to the terminal 500. In another aspect, the sets of codes may be downloaded into the terminal 500 from an external device or communication network resource. The sets of codes, when executed, cause the terminal 500 to provide aspects of a usage tracking system as described herein.

Figure 6:
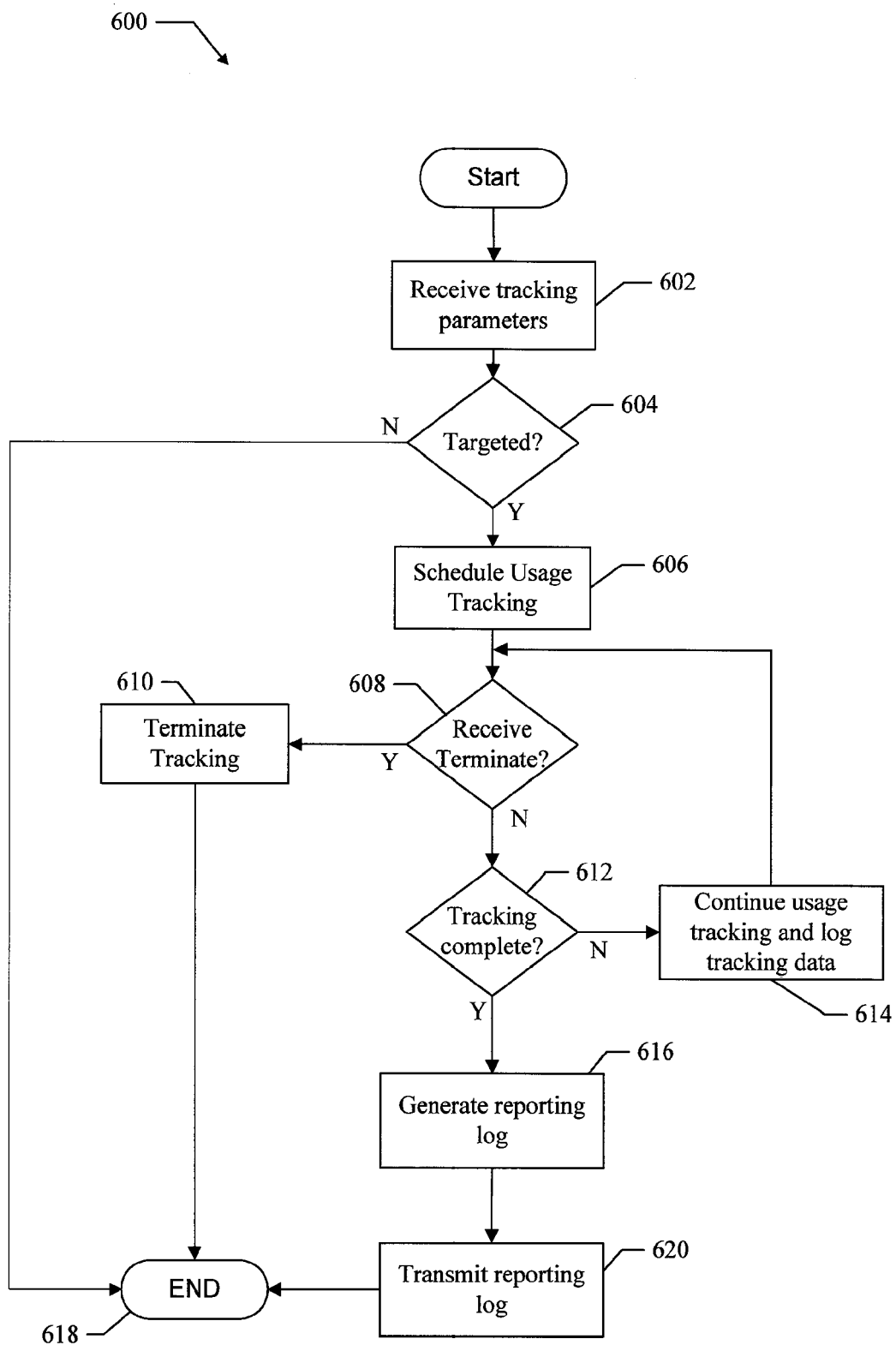
FIG. 6 shows an exemplary method for operating a terminal for use in aspects of a usage tracking system.

FIG. 6 shows an exemplary method 600 for operating a terminal in aspects of a usage tracking system. For clarity, the method 600 will be described with reference to the terminal 500 shown in FIG. 5. In various aspects, the processing logic 502 executes program instructions to control the terminal 500 to perform the functions described below.

At block 602, tracking parameters are received at the terminal from a usage server in a data network. For example, the processing logic 502 receives the tracking parameters via an overhead notification mechanism that may comprise a control channel that is part of the transceiver logic 508. In an aspect, the tracking parameters describe applications and events related to those applications that are to be logged at the terminal. The tracking parameters are stored in the memory 504.

At block 604, a test is performed to determine if the terminal has been selected as a targeted terminal. For example, the processing logic 502 processes the tracking parameters to determine if the terminal is a targeted terminal. In an aspect, the processing logic 502 generates a random number that is compared to a percentage indicator included in the tracking parameters. If the random number is within a selected range defined by the percentage indicator, then the terminal is a targeted terminal. In another embodiment, the tracking parameters include a seed value and the processing logic 502 combines the seed value with a terminal identifier to generate a selection indicator that is then compared to the percentage indicator. If the selection indicator is within a selected range defined by the percentage indicator, then the terminal is a targeted terminal. Thus, any suitable technique may be used by the terminal to determine if it is a targeted terminal.

At block 606, the usage tracking at the terminal is scheduled. For example, the scheduling logic 510 operates to schedule usage tracking according to the tracking parameters stored in the memory 504. For example, the tracking parameters may include a time window indicator that identifies a time period when usage tracking should occur. The scheduling logic 510 processes the time window indicator to schedule usage tracking.

At block 608, a determination is made to determine whether the terminal has received a terminate instruction that will terminate any pending usage tracking. For example, the usage server may terminate usage tracking by transmitting updated tracking parameters to the terminal. In an aspect, the server transmits tracking parameters that set the time window indicator to zero. In response, the terminal terminates any pending usage tracking and either discards any collected data or sends it to the server in their next communication session. If usage tracking is terminated, the method proceeds to block 610. If usage tracking has not been terminated, the method proceeds to block 612.

At block 610, usage tracking is terminated and any logged data will either be transmitted to the usage server at the next available communication or discarded. In an aspect, the processing logic 502 processes the logging status tracking parameter to determine how to handle previously logged tracking data. The method then ends at block 618.

At block 612, a determination is made to determine if the usage tracking is complete. For example, in an aspect, usage tracking is scheduled to occur within a selected time window. If usage tracking has occurred during the time window and the time window has expired, then the usage tracking is complete. In an aspect, the terminal may be realized that the usage tracking data is no longer of interest, and as a result, the terminal stop logging and either discards the logged usage tracking data or attempts to upload the available data. If the usage tracking is complete, the method proceeds to block 616. If the usage tracking is not complete, the method proceeds to block 614.

At block 614, the terminal continues logging usage data in accordance with the tracking parameters. For example, in an aspect, the processing logic 502 retrieves the tracking parameters from the memory 504 and logs device usage accordingly. The logged tracking data is then stored in the memory 504 until the tracking is terminated or the tracking window expires. The method proceeds to block 608 where a determination is made as to whether a terminate instruction has been received.

At block 616, a reporting log is generated. In an aspect, reporting parameters are used to determine when (or under what conditions) tracking events are to be reported. For example, the reporting parameters indicate when a tracked event is to be reported. In an aspect, the reporting logic 512 processes the stored usage tracking data based on the reporting parameters to generated the reporting log. The reporting parameters represent criteria that are used to filter the usage tracking data, so that the reporting log includes only that information which meets the reporting criteria.

At block 620, usage tracking is completed and the terminal transmits the reporting log to the usage server. For example, the tracking data is filtered from the tracking logs based on the reporting parameters to generate the reporting log. The reporting log is transmitted on the reverse link 518 during communications between the terminal and the usage server. In an aspect, the reporting log is transmitted in an identifiable manner and the server operates to map the identity of the terminal to a device log identifier that protects the identity of the terminal.

Thus, the method 600 operates to allow a terminal to receive tracking parameters, perform usage tracking, and report the results in a bandwidth efficient manner. It should be noted that the method 600 illustrates just implementation and that changes, additions, or rearrangements of the flow elements may be made without deviating from the scope of the described aspects.

Figure 7:
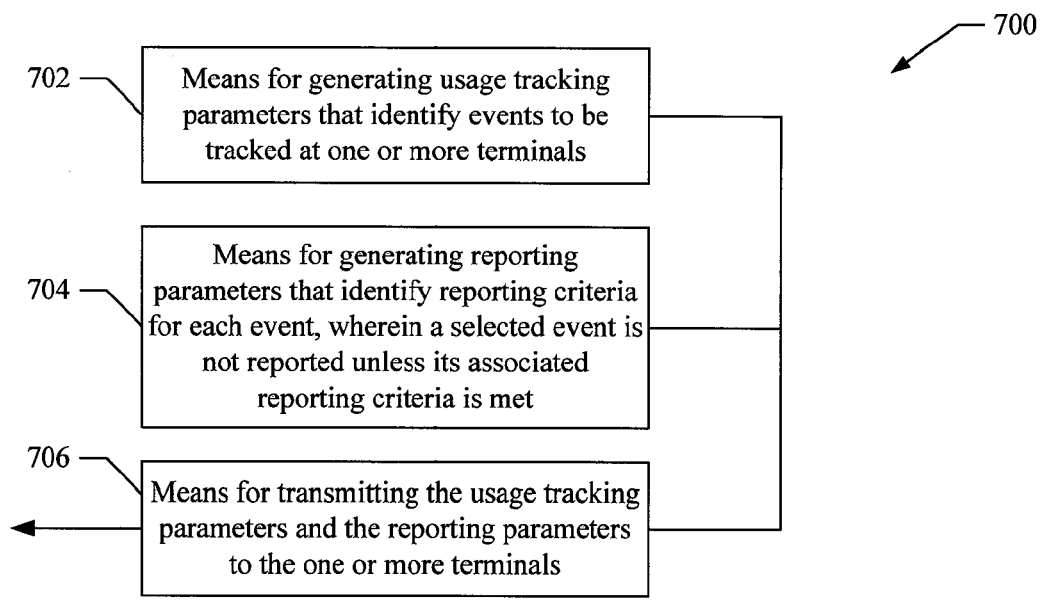
FIG. 7 shows an exemplary server for providing aspects of a usage tracking system.

FIG. 7 shows an exemplary server 700 for providing aspects of a usage tracking system. In an aspect, the server 700 is implemented by at least one processor or integrated circuit comprising one or more modules configured to provide aspects of a usage tracking system as described herein. For example, each module comprises hardware, and/or hardware executing software.

The server 700 comprises a first module comprising means 702 for means for generating usage tracking parameters that identify events to be tracked at one or more terminals. For example, the means 702 comprises the parameter logic 214.

The server 700 also comprises a second module comprising means 704 for means for generating reporting parameters that identify reporting criteria for each event, wherein a selected event is not reported unless its associated reporting criteria is met. For example, in an aspect, the means 704 comprises the parameter logic 214.

The server 700 also comprises a third module comprising means 706 for transmitting the usage tracking parameters and the reporting parameters to the one or more terminals. For example, in an aspect, the means 706 comprises the transceiver logic 210.

Figure 8:
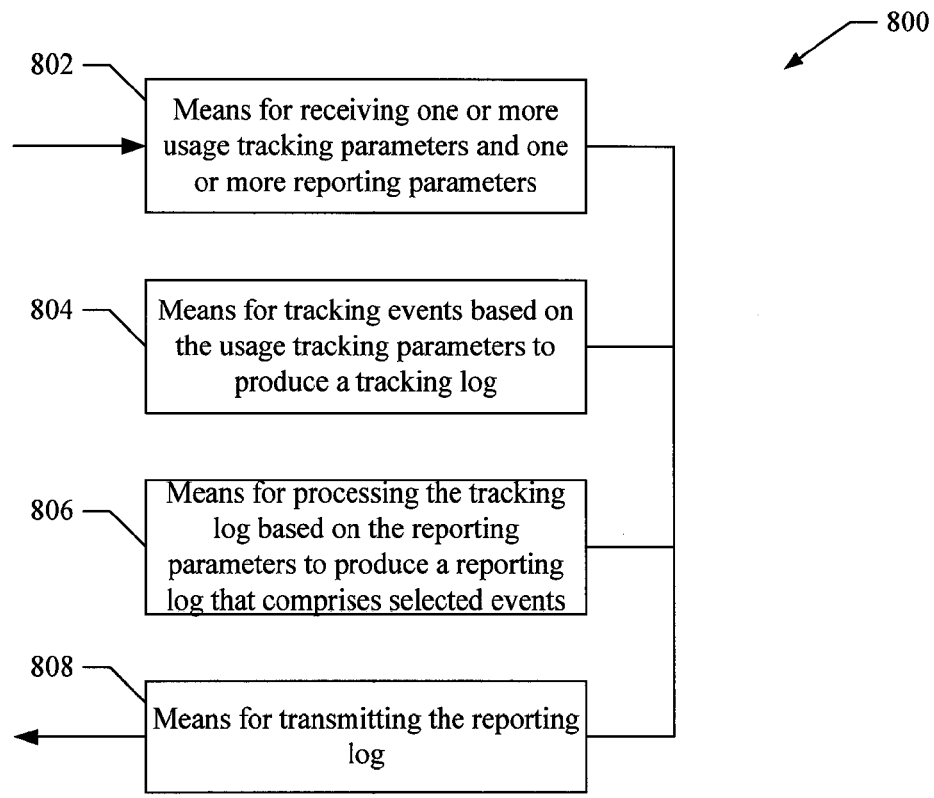
FIG. 8 shows an exemplary terminal for providing aspects of a usage tracking system.

FIG. 8 shows an exemplary device 800 for providing aspects of a usage tracking system. In an aspect, the device 800 is implemented by at least one processor or integrated circuit comprising one or more modules configured to provide aspects of a usage system as described herein. For example, each module comprises hardware and/or hardware executing software.

The device 800 comprises a first module that comprises means 802 for receiving one or more usage tracking parameters and one or more reporting parameters, wherein the usage tracking parameters identify events to be tracked and the reporting parameters identify reporting criteria for each event. For example, in an aspect, the means 802 comprises the transceiver logic 508.

The device 800 comprises a second module that comprises means 804 for tracking the events based on the usage tracking parameters to produce a tracking log. For example, in an aspect, the means 804 comprises scheduling logic 510.

The device 800 also comprises a third module that comprises means 806 for processing the tracking log based on the reporting parameters to produce a reporting log that comprises selected events. For example, in an aspect, the means 806 comprises the reporting logic 512.

The device 800 also comprises a fourth module that comprises means 808 for transmitting the reporting log. For example, in an aspect, the means 808 comprises the transceiver logic 508.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a usage tracking system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

We claim:

1. A method for performing usage tracking, the method comprising:
    generating usage tracking parameters for tracking events at terminals, wherein the generated usage tracking parameters enable each terminal to determine whether the terminal is targeted;
    generating reporting parameters that provide reporting criteria for determining when each of the tracked events is to be reported, the reporting criteria identifying a defined time period during which a targeted terminal is to upload tracking data, the reporting parameters identifying a threshold number of occurrences of a selected event that indicates when to commence or cease reporting of the selected event; and
    transmitting the usage tracking parameters and the reporting parameters to the terminals,
    wherein the terminals are configured to commence or cease reporting of the selected event based on the threshold number of occurrences.

2. The method of claim 1, wherein said transmitting comprises transmitting the usage tracking parameters and the reporting parameters using at least one of a broadcast, a multicast, a unicast, and a control channel transmission.

3. The method of claim 1, further comprising identifying a targeted set of terminals among the terminals.

4. The method of claim 1, further comprising receiving a reporting log from at least one terminal.

5. The method of claim 1, further comprising:
    generating, in response to a received reporting log from a terminal, a unique device log identifier using a predetermined function that maps to a terminal identity, such that the generated device log identifier retains anonymity of the terminal.

6. An apparatus for performing usage tracking, the apparatus comprising:
    processing logic configured to generate usage tracking parameters for tracking events at terminals and reporting parameters that provide reporting criteria for determining when each of the tracked events is to be reported, the reporting criteria identifying a defined time period during which a targeted terminal is to upload tracking data, and wherein the usage tracking parameters enable each terminal to determine whether the terminal is targeted, the reporting parameters identifying a threshold number of occurrences of a selected event that indicates when to commence or cease reporting of the selected event; and a transceiver configured to transmit the usage tracking parameters and the reporting parameters to the terminals, wherein the terminals are configured to commence or cease reporting of the selected event based on the threshold number of occurrences.

7. The apparatus of claim 6, wherein said transceiver is configured to transmit the usage tracking parameters and the reporting parameters using at least one of a broadcast, a multicast, a unicast, and a control channel transmission.

8. The apparatus of claim 6, wherein said processing logic is configured to identify a targeted set of terminals among the terminals.

9. The apparatus of claim 6, wherein the transceiver is further configured to receive a reporting log from a terminal, and wherein said processing logic is configured to generate, in response to the received reporting log from the terminal, a unique device log identifier using a predetermined function that maps to a terminal identity, such that the generated device log identifier retains anonymity of the terminal.

10. An server, comprising:

a memory;

a processor coupled to the memory, wherein the processor is configured with processor-executable instructions to perform steps comprising:

generating usage tracking parameters to track events at terminals, wherein the generated usage tracking parameters enable each terminal to determine whether the terminal is targeted generating reporting parameters that provide reporting criteria for determining when each of the tracked events is to be reported, the reporting criteria identifying a defined time period during which a targeted terminal is to upload tracking data, the reporting parameters identifying a threshold number of occurrences of a selected event that indicates when to commence or cease reporting of the selected event; and transmitting the usage tracking parameters and the reporting parameters to the terminals, wherein the processor is configured with processor-executable instructions to perform operations such that the terminals are configured to commence or cease reporting of the selected event based on the threshold number of occurrences.

11. The server of claim 10, wherein the processor is configured with processor-executable instructions to perform operations further comprising transmitting the usage tracking parameters and the reporting parameters using at least one of a broadcast, a multicast, a unicast, and a control channel transmission.

12. The server of claim 10, wherein the processor is configured with processor-executable instructions to perform operations further comprising identifying a targeted set of terminals among the terminals.

13. The server of claim 10, where the processor is configured with processor-executable instructions to perform operations further comprising:

receiving a reporting log from at least one terminal; and generating, in response to the received reporting log from the terminal, a unique device log identifier using a predetermined function that maps to a terminal identity, such that the generated device log identifier retains anonymity of the terminal.

14. The server of claim 10, wherein the processor is configured with processor-executable instructions to perform operations further comprising receiving a reporting log from at least one terminal.

15. A non-transitory server-readable storage medium having stored thereon processor-executable instructions configured to cause a server processor to perform operations comprising:

generating usage tracking parameters for tracking events at terminals, wherein the generated usage tracking parameters enable each terminal to determine whether the terminal is targeted;

generating reporting parameters that provide reporting criteria for determining when each of the tracked events is to be reported, the reporting criteria identifying a defined time period during which a targeted terminal is to upload tracking data, the reporting parameters identifying a threshold number of occurrences of a selected event that indicates when to commence or cease reporting of the selected event; and transmitting the usage tracking parameters and the reporting parameters to the terminals, wherein the stored processor-executable instructions are configured to cause a server processor to perform operations such that the terminals are configured to commence or cease reporting of the selected event based on the threshold number of occurrences.

16. The non-transitory server-readable storage medium of claim 15, wherein the stored processor-executable instructions are configured to cause a server processor to perform operations further comprising:

generating, in response to a received reporting log from a terminal, a unique device log identifier using a predetermined function that maps to a terminal identity, such that the generated device log identifier retains anonymity of the terminal.

17. The non-transitory server-readable storage medium of claim 15, wherein the stored processor-executable instructions are configured to cause a server processor to perform operations such that transmitting the usage tacking parameters and the reporting parameters to the terminals comprises transmitting the usage tracking parameters and the reporting parameters using at least one of a broadcast, a multicast, a unicast, and a control channel transmission.

18. The non-transitory server-readable storage medium of claim 15, wherein the stored processor-executable instructions are configured to cause a server processor to perform operations further comprising identifying a targeted set of terminals among the terminals.

19. The non-transitory server-readable storage medium of claim 15, wherein the stored processor-executable instructions are configured to cause a server processor to perform operations further comprising receiving a reporting log from at least one terminal.

20. A server for performing usage tracking, the server comprising:

an antenna;

a memory;

a processor coupled to the memory, wherein the processor is configured with processor-executable instructions to perform operations comprising:

generating usage tracking parameters for tracking events at terminals and reporting parameters that provide reporting criteria for determining when each of the tracked events is to be reported, and wherein the generated usage tracking parameters enable each terminal to determine whether the terminal is targeted, the reporting criteria identifying a defined time period during which a targeted terminal is to upload tracking data, the reporting parameters identifying a threshold number of occurrences of a selected event that indicates when to commence or cease reporting of the selected event; and a transceiver coupled to the antenna and configured to transmit the usage tracking parameters and the reporting parameters to the terminals, wherein the terminals are configured to commence or cease reporting of the selected event based on the threshold number of occurrences.

21. The server of claim 14, wherein the transceiver is further configured to receive a reporting log from a terminal, and wherein said processing logic is further configured to generate, in response to the received reporting log from the terminal, a unique device log identifier using a predetermined function that maps to a terminal identity, such that the generated device log identifier retains anonymity of the terminal.

22. A method for performing usage tracking at a device, the method comprising:

receiving one or more usage tracking parameters and one or more reporting parameters, wherein the usage tracking parameters identify events to be tracked and the reporting parameters identify reporting criteria for determining when each of the tracked events is to be reported, and wherein the received usage tracking parameters enable the device to determine whether the device is targeted, the reporting criteria identifying a defined time period during which a targeted terminal is to upload tracking data, the reporting parameters further identifying a threshold number of occurrences of a selected event that indicates when to commence or cease reporting of the selected event;

tracking the events based on the usage tracking parameters to produce a tracking log;

processing the tracking log based on the reporting parameters to produce a reporting log that comprises tracked events; and transmitting the reporting log, wherein the device is configured to commence or cease reporting of the selected event based on the threshold number of occurrences.

23. The method of claim 22, further comprising determining that the device has been targeted based on the usage tracking parameters.

24. The method of claim 22, further comprising scheduling said tracking based on the usage tracking parameters.

25. The method of claim 22, wherein said processing comprises determining that each of the tracked events meets its associated reporting criteria.

26. The method of claim 25, wherein the associated reporting criteria identifies a selected number of occurrences.

27. The method of claim 22, wherein said receiving comprises receiving the usage tracking parameters and the reporting parameters in at least one of a broadcast, multicast, unicast, and control channel transmissions.

28. The method of claim 22, wherein the reporting log is stored in an anonymous manner to protect an identity of the device and its user.

29. The apparatus of claim 28, wherein the associated reporting criteria identifies a selected number of occurrences.

30. The apparatus of claim 29, further comprising processing logic configured to determine that the device has been targeted based on the usage tracking parameters.

31. The apparatus of claim 29, wherein said scheduling logic is configured to schedule said tracking based on the usage tracking parameters.

32. The apparatus of claim 29, wherein said reporting logic is configured to determine that each of the tracked events meets its associated reporting criteria.

33. The apparatus of claim 32, wherein the associated reporting criteria identifies a selected number of occurrences.

34. The apparatus of claim 29, wherein said transceiver logic is configured to receive the usage tracking parameters and the reporting parameters in at least one of a broadcast, multicast, unicast, and control channel transmissions.

35. The device of claim 29, wherein the reporting log is stored in an anonymous manner to protect an identity of the device and its user.

36. A device, comprising:

a processor configured with processor-executable instructions to perform operations comprising:

receiving one or more usage tracking parameters and one or more reporting parameters, wherein the usage tracking parameters identify events to be tracked and the reporting parameters identify reporting criteria for determining when each of the tracked events is to be reported, and wherein the received usage tracking parameters enable the device to determine whether the device is targeted, the reporting criteria identifying a defined time period during which a targeted terminal is to upload tracking data, the reporting parameters further identifying a threshold number of occurrences of a selected event that indicates when to commence or cease reporting of the selected event;

tracking the events based on the usage tracking parameters to produce a tracking log;

processing the tracking log based on the reporting parameters to produce a reporting log that comprises tracked events; and transmitting the reporting log, wherein the processor is configured with processor-executable instructions to perform operations to commence or cease reporting of the selected event based on the threshold number of occurrences.

37. The device of claim 36, wherein the processor is configured with processor-executable instructions to perform operations further comprising determining that the device has been targeted based on the usage tracking parameters.

38. The device of claim 36, wherein the processor is configured with processor-executable instructions to perform operations further comprising scheduling said tracking based on the usage tracking parameters.

39. The device of claim 36, wherein the processor is configured with processor-executable instructions to perform operations further comprising determining that each of the tracked events meets its associated reporting criteria.

40. The device of claim 39, wherein the processor is configured with processor-executable instructions to perform operations such that the associated reporting criteria identifies a selected number of occurrences.

41. The device of claim 36, wherein the processor is configured with processor-executable instructions to perform operations further comprising receiving the usage tracking parameters and the reporting parameters in at least one of a broadcast, multicast, unicast, and control channel transmissions.

42. The device of claim 36, wherein the processor is configured with processor-executable instructions to perform operations such that the reporting log is stored in an anonymous manner to protect an identity of the device and its user.

43. A non-transitory computer-readable storage medium having stored thereon processor-executable instructions to cause a processor to perform operations comprising:
  receiving one or more usage tracking parameters and one or more reporting parameters, wherein the usage tracking parameters identify events to be tracked and the reporting parameters identify reporting criteria for determining when each of the tracked events is to be reported, and wherein the received usage tracking parameters enable a device to determine whether the device is targeted, the reporting criteria identifying a defined time period during which a targeted terminal is to upload tracking data, the reporting parameters further identifying a threshold number of occurrences of a selected event that indicates when to commence or cease reporting of the selected event;
  tracking the events based on the usage tracking parameters to produce a tracking log;
  processing the tracking log based on the reporting parameters to produce a reporting log that comprises tracked events; and
  transmitting the reporting log,
  wherein the stored processor-executable instructions are configured to cause a device processor to perform operations such that reporting of the selected event commences or ceases based on the threshold number of occurrences.

44. The non-transitory computer-readable storage medium of claim 43, wherein the stored processor-executable instructions are configured to cause a device processor to perform operations such that the reporting log is stored in an anonymous manner to protect an identity of the device and its user.

45. The non-transitory computer-readable storage medium of claim 43, wherein the stored processor-executable instructions are configured to cause a device processor to perform operations further comprising determining that the device has been targeted based on the usage tracking parameters.

46. The non-transitory computer-readable storage medium of claim 43, wherein the stored processor-executable instructions are configured to cause a device processor to perform operations further comprising scheduling said tracking based on the usage tracking parameters.

47. The non-transitory computer-readable storage medium of claim 43, wherein the stored processor-executable instructions are configured to cause a device processor to perform operations such that processing comprises determining that each of the tracked events meets its associated reporting criteria.

48. The non-transitory computer-readable storage medium of claim 47, wherein the stored processor-executable instructions are configured to cause a device processor to perform operations such that the associated reporting criteria identifies a selected number of occurrences.

49. The non-transitory computer-readable storage medium of claim 43, wherein the stored processor-executable instructions are configured to cause a device processor to perform operations such that receiving one or more usage tracking parameters and one or more reporting parameters comprises receiving the usage tracking parameters and the reporting parameters in at least one of a broadcast, multicast, unicast, and control channel transmissions.

50. A device for performing usage tracking, the device comprising:
  an antenna;
  transceiver logic coupled to the antenna and configured to receive one or more usage tracking parameters and one or more reporting parameters, wherein the usage tracking parameters identify events to be tracked and the reporting parameters identify reporting criteria for determining when each of the tracked events is to be reported, and wherein the received usage tracking parameters enable the device to determine whether the device is targeted, the reporting criteria identifying a defined time period during which a targeted terminal is to upload tracking data, the reporting parameters further identifying a threshold number of occurrences of a selected event that indicates when to commence or cease reporting of the selected event;
  scheduling logic configure to track the events based on the usage tracking parameters to produce a tracking log; and
  reporting logic configured to process the tracking log based on the reporting parameters to produce a reporting log that comprises tracked events,
  wherein the transceiver logic is further configured to transmit the reporting log, and
  wherein the device is configured to commence or cease reporting of the selected event based on the threshold number of occurrences.

51. The device of claim 50, wherein the reporting log is stored in an anonymous manner to protect an identity of the device and its user.

52. A method for performing usage tracking, the method comprising:
  generating usage tracking parameters that identify events to be tracked at one or more terminals;
  generating reporting parameters that identify reporting criteria for each event, the reporting parameters further identifying a threshold number of occurrences of a selected event that indicates when to commence or cease reporting of the selected event; and
  transmitting the usage tracking parameters and the reporting parameters to the one or more terminals,
  wherein the one or more terminals are configured to commence or cease reporting of the selected event based on the threshold number of occurrences.

53. A method for performing usage tracking at a device, the method comprising:
  receiving one or more usage tracking parameters and one or more reporting parameters, wherein the usage tracking parameters identify events to be tracked and the reporting parameters identify reporting criteria for each event, the reporting parameters further identifying a threshold number of occurrences of a selected event that indicates when to commence or cease reporting of the selected event;
  tracking the events based on the usage tracking parameters to produce a tracking log;
  processing the tracking log based on the reporting parameters to produce a reporting log that comprises selected events; and
  transmitting the reporting log,
  wherein the device is configured to commence or cease reporting of the selected event based on the threshold number of occurrences.

54. A server comprising:
  means for generating usage tracking parameters for tracking events at terminals, wherein the generated usage tracking parameters enable each terminal to determine whether the terminal is targeted;
  means for generating reporting parameters that provide reporting criteria for determining when each of the tracked events is to be reported, the reporting criteria identifying a defined time period during which a targeted terminal is to upload tracking data, the reporting parameters identifying a threshold number of occurrences of a selected event that indicates when to commence or cease reporting of the selected event; and means for transmitting the usage tracking parameters and the reporting parameters to the terminals, wherein the terminals are configured to commence or cease reporting of the selected event based on the threshold number of occurrences.

55. The server of claim 54, wherein means for transmitting the usage tracking parameters and the reporting parameters to the terminals comprises means for transmitting the usage tracking parameters and the reporting parameters using at least one of a broadcast, a multicast, a unicast, and a control channel transmission.

56. The server of claim 54, further comprising means for identifying a targeted set of terminals among the terminals.

57. The server of claim 54, further comprising means for receiving a reporting log from at least one terminal.

58. The server of claim 54, further comprising:
means for generating, in response to a received reporting log from a terminal, a unique device log identifier using a predetermined function that maps to a terminal identity, such that the generated device log identifier retains anonymity of the terminal.

59. A device, comprising:
means for receiving one or more usage tracking parameters and one or more reporting parameters, wherein the usage tracking parameters identify events to be tracked and the reporting parameters identify reporting criteria for determining when each of the tracked events is to be reported, and wherein the received usage tracking parameters enable the device to determine whether the device is targeted, the reporting criteria identifying a defined time period during which a targeted terminal is to upload tracking data, the reporting parameters further identifying a threshold number of occurrences of a selected event that indicates when to commence or cease reporting of the selected event;

means for tracking the events based on the usage tracking parameters to produce a tracking log;

means for processing the tracking log based on the reporting parameters to produce a reporting log that comprises tracked events; and means for transmitting the reporting log, wherein the device is configured to commence or cease reporting of the selected event based on the threshold number of occurrences.

60. The device of claim 59, further comprising means for determining that the device has been targeted based on the usage tracking parameters.

61. The device of claim 59, further comprising means for scheduling said tracking based on the usage tracking parameters.

62. The device of claim 59, wherein means for processing comprises means for determining that each of the tracked events meets its associated reporting criteria.

63. The device of claim 62, wherein the associated reporting criteria identifies a selected number of occurrences.

64. The device of claim 59, wherein means for receiving comprises means for receiving the usage tracking parameters and the reporting parameters in at least one of a broadcast, multicast, unicast, and control channel transmissions.

65. The device of claim 59, wherein the reporting log is stored in an anonymous manner to protect an identity of the device and its user.

66. A server, comprising:
a memory;
a processor coupled to the memory, wherein the processor is configured with processor-executable instructions to perform operations comprising:
generating usage tracking parameters that identify events to be tracked at one or more terminals;
generating reporting parameters that identify reporting criteria for each event, the reporting parameters further identifying a threshold number of occurrences of a selected event that indicates when to commence or cease reporting of the selected event; and
transmitting the usage tracking parameters and the reporting parameters to the one or more terminals,
wherein the processor is configured with processor-executable instructions to perform operations such that the one or more terminals are configured to commence or cease reporting of the selected event based on the threshold number of occurrences.

67. A non-transitory server-readable storage medium having stored thereon processor-executable instructions configured to cause a server processor to perform operations comprising:
generating usage tracking parameters that identify events to be tracked at one or more terminals;
generating reporting parameters that identify reporting criteria for each event, the reporting parameters further identifying a threshold number of occurrences of a selected event that indicates when to commence or cease reporting of the selected event; and
transmitting the usage tracking parameters and the reporting parameters to the one or more terminals,
wherein the stored processor-executable instructions are configured to cause a server processor to perform operations such that the one or more terminals are configured to commence or cease reporting of the selected event based on the threshold number of occurrences.

68. A server, comprising:
means for generating usage tracking parameters that identify events to be tracked at one or more terminals;
means for generating reporting parameters that identify reporting criteria for each event, the reporting parameters further identifying a threshold number of occurrences of a selected event that indicates when to commence or cease reporting of the selected event; and
means for transmitting the usage tracking parameters and the reporting parameters to the one or more terminals,
wherein the one or more terminals are configured to commence or cease reporting of the selected event based on the threshold number of occurrences.

69. An device, comprising:
a processor configured with processor-executable instructions to perform operations comprising:
receiving one or more usage tracking parameters and one or more reporting parameters, wherein the usage tracking parameters identify events to be tracked and the reporting parameters identify reporting criteria for each event, the reporting parameters further identifying a threshold number of occurrences of a selected event that indicates when to commence or cease reporting of the selected event;
tracking the events based on the usage tracking parameters to produce a tracking log;
processing the tracking log based on the reporting parameters to produce a reporting log that comprises selected events; and
transmitting the reporting log, wherein the processor is configured with processor-executable instructions to perform operations to commence or cease reporting of the selected event based on the threshold number of occurrences.

70. A non-transitory computer-readable storage medium having stored thereon processor-executable instructions to cause a device processor to perform operations comprising:

receiving one or more usage tracking parameters and one or more reporting parameters, wherein the usage tracking parameters identify events to be tracked and the reporting parameters identify reporting criteria for each event, the reporting parameters further identifying a threshold number of occurrences of a selected event that indicates when to commence or cease reporting of the selected event;

tracking the events based on the usage tracking parameters to produce a tracking log;

processing the tracking log based on the reporting parameters to produce a reporting log that comprises selected events; and transmitting the reporting log, wherein the stored processor-executable instructions are configured to cause a device processor to perform operations to commence or cease reporting of the selected event based on the threshold number of occurrences.

71. A device, comprising:

means for receiving one or more usage tracking parameters and one or more reporting parameters, wherein the usage tracking parameters identify events to be tracked and the reporting parameters identify reporting criteria for each event, the reporting parameters further identifying a threshold number of occurrences of a selected event that indicates when to commence or cease reporting of the selected event;

means for tracking the events based on the usage tracking parameters to produce a tracking log;

means for processing the tracking log based on the reporting parameters to produce a reporting log that comprises selected events; and means for transmitting the reporting log, wherein the device is configured to commence or cease reporting of the selected event based on the threshold number of occurrences.

* * * * *